United States Patent
Fontaine

(10) Patent No.: US 11,288,471 B2
(45) Date of Patent: Mar. 29, 2022

(54) METHOD FOR ARTICLE AUTHENTICATION

(71) Applicant: Chameleon Innovations Australia (CIA) Pty Ltd, Burswood (AU)

(72) Inventor: Thomas Fontaine, Gooseberry Hill (AU)

(73) Assignee: Chameleon Innovations Australia (CIA) Pty Ltd, Burswood (AU)

( * ) Notice: Subject to any disclaimer, the term of this patent is extended or adjusted under 35 U.S.C. 154(b) by 0 days.

(21) Appl. No.: 16/971,520

(22) PCT Filed: Feb. 20, 2019

(86) PCT No.: PCT/AU2019/050140
§ 371 (c)(1),
(2) Date: Aug. 20, 2020

(87) PCT Pub. No.: WO2019/161445
PCT Pub. Date: Aug. 29, 2019

(65) Prior Publication Data
US 2020/0394372 A1  Dec. 17, 2020

(30) Foreign Application Priority Data
Feb. 20, 2018  (AU) ................................ 2018900526

(51) Int. Cl.
*G06K 7/10* (2006.01)
*B42D 25/30* (2014.01)
(Continued)

(52) U.S. Cl.
CPC ........... *G06K 7/10722* (2013.01); *B41M 3/14* (2013.01); *B42D 25/30* (2014.10); *G06F 16/55* (2019.01);
(Continued)

(58) Field of Classification Search
CPC ............................ G06K 7/10722; B42D 25/30
(Continued)

(56) References Cited

U.S. PATENT DOCUMENTS

| | | | | |
|---|---|---|---|---|
| 2003/0169315 A1* | 9/2003 | Pickrell | ................ | B41J 2/1429 |
| | | | | 347/68 |
| 2005/0239207 A1 | 10/2005 | Gelbart | | |
| 2016/0371438 A1* | 12/2016 | Annulis | ................ | G06F 21/32 |

FOREIGN PATENT DOCUMENTS

| | | |
|---|---|---|
| AU | 734643 B2 | 4/1999 |
| EP | 2790133 A1 | 10/2014 |
| WO | 2004/070667 A2 | 8/2004 |

OTHER PUBLICATIONS

International Search Report and Written Opinion dated Apr. 9, 2019 from International Application No. PCT/AU2019/050140 (Authorised officer, Andrew Wong), 8 pages.

\* cited by examiner

*Primary Examiner* — Allyson N Trail
(74) *Attorney, Agent, or Firm* — MH2 Technology Law Group, LLP

(57) ABSTRACT

A method of marking an article for authentication, the comprising the steps of applying an identification mark to an article, said mark comprising an array of varying sized markings, where the combination of the shape, the spatial distribution and the varying sizes of the markings imparts a distinctiveness to the identification mark recording the identification mark in a database and associating information relating to the article with the identification mark in the database, wherein comparison of the identification mark on the article and the database enables the identification mark to be associated with the information relating to the article on the database.

21 Claims, 15 Drawing Sheets

(51) Int. Cl.
*G06F 16/55* (2019.01)
*B41M 3/14* (2006.01)
*G06K 7/14* (2006.01)
*G06K 9/00* (2006.01)
*G06K 9/62* (2006.01)
*G06K 19/06* (2006.01)

(52) U.S. Cl.
CPC ....... *G06K 7/1417* (2013.01); *G06K 9/00577* (2013.01); *G06K 9/6201* (2013.01); *G06K 19/06037* (2013.01); *G06K 2009/0059* (2013.01)

(58) Field of Classification Search
USPC .................................................. 235/462.11
See application file for complete search history.

FIG. 5C

METHOD FOR ARTICLE AUTHENTICATION

CROSS-REFERENCE TO RELATED APPLICATIONS

This application is a U.S. National Stage application of PCT/AU2019/050140, filed 20 Feb. 2019, which claims priority to Australian Application No. 2018900526, filed 20 Feb. 2018, the entire disclosures of which are incorporated herein by reference in their entireties.

TECHNICAL FIELD

The present invention relates to a method of marking articles for authentication. More specifically, the method of the present invention allows for each article to be provided with an identification mark that allows for the verification of the articles authenticity or to identify the article.

BACKGROUND ART

The following discussion of the background art is intended to facilitate an understanding of the present invention only. The discussion is not an acknowledgement or admission that any of the material referred to is or was part of the common general knowledge as at the priority date of the application.

The counterfeiting of articles is major problem facing both retailers and consumers. In order to combat such counterfeiting there needs to be a means to authenticate the article.

Means such as holographic tamper-proof stickers have been used in the prior art. However, such stickers themselves are often counterfeited as counterfeiting technology itself develops. To combat this, manufacturers have turned to more advanced forms of authentication. Whilst the ability to counterfeit these advanced forms of identification is diminished, they come with a trade-off. Typically, either the cost to manufacture increases or the authentication process is cumbersome. This means that such forms of authentication are not typically suited for items that are produced on a large scale.

It is known to use tracking systems as suitable means for authentication of articles. Tracking systems typically make use of barcodes or other readable codes on the device that can be scanned with readers. Whilst the complexity of such barcodes has increased with the development of matrix barcodes (QR Code™), these barcodes still rely on a standardised encoding structure that is easily reproduced.

Throughout this specification, unless the context requires otherwise, the word "comprise" or variations such as "comprises" or "comprising", will be understood to imply the inclusion of a stated integer or group of integers but not the exclusion of any other integer or group of integers.

SUMMARY OF INVENTION

The present invention relates to a method of marking an article for authentication, the method comprising the steps of:
  applying an identification mark to an article, said mark comprising a random array of varying sized markings, where the combination of the shape, the spatial distribution and the varying sizes of the markings imparts a distinctiveness to the identification mark;
  recording the identification mark in a database; and
  associating information relating to the article with the identification mark in the database,
wherein comparison of the identification mark on the article with identification marks in the database enables the information relating to the article to be linked with the identification mark on the article.

The inventors have identified that the use of an identification mark that comprises an array of markings of varying shapes, sizes and locations allows for an almost infinite number of identification marks to be generated.

In one form of the present invention, each of the markings are non-polygonal. In the context of the present invention, the term "non-polygonal" will refer to a shape where the outer perimeter is curved. Suitable non-polynomial shapes include ellipses, circles and irregular shapes with curved perimeters.

Preferably, the array of varying sized markings is unstructured.

Preferably, the array of varying sized markings is random.

Preferably, comparison of an identification mark with the identification marks in the database allows for the article to be authenticated.

In one form of the present invention, the database will track the date and location of the article when the comparison is made. It is envisaged by the inventors that the tracking of the date and/or location of the article will provide another layer of the authentication as the location of the article can be accurately followed by the database. This information may be used to assist in the determination of whether the captured identification mark is authentic.

In one form of the present invention, the step of recording the identification mark in a database more specifically comprises the steps of:
  capturing image data of the identification mark; and
  storing the captured image data in a database.

Throughout this specification, unless the context requires otherwise, the term "image data" or variations, will be understood to refer to a numeric representation of an image. Preferably, the image data is provided as a raster image. As would be appreciated by a person skilled in the art, a raster image has a finite set of digital values, called pixels. Each pixel holds values that represent the brightness of a given colour at a specific point.

In one form of the present invention, the step of comparison of the identification mark on the article with identification marks in the database more specifically comprises the steps of:
  capturing image data of the identification mark; and
  comparing the image data with the image data of identification marks in the database.

In one form of the present invention, the database is stored on a server. In one form of the present invention, the server is a remote server. Preferably, the image data is uploaded to the server or remote server for comparison with the database.

In one form of the present invention, image data of the identification mark is captured with an image capturing device. Preferably, the image capturing device is a mobile image capturing device. In one form of the invention, the image capturing device is a mobile telephone.

In one form of the present invention, the step of comparison of the identification mark on the article with identification marks in the database comprises uploading the captured image data to the database for comparison. Preferably, where the image data is captured with a mobile image capturing device, the mobile image capturing device comprises software that facilitates the upload of the captured image data to the database for comparison.

In a highly preferred form of the present invention, a mobile application facilitates the capture of image data of the identification mark and the upload of the captured image data to the database for comparison. Preferably, the mobile application further provides feedback on the results of the comparison.

In one form of the present invention, the comparison of the image data and the database is performed using an image comparison algorithm.

In one form of the present invention, the comparison of the image data and the database is performed using image comparison software.

In one form of the present invention, the identification mark is applied to the article using a marking composition. Preferably, at least a portion of the marking composition is a liquid. Preferably, the liquid portion dries or evaporates upon application.

In one form of the present invention, the marking composition is visible in the visible spectrum. In an alternative form of the present invention, the marking composition is not visible in the visible spectrum. Preferably, where the marking composition is not visible in the visible spectrum, the marking composition contains compounds that fluoresce in the visible spectrum under excitement or are visible in different parts of the electromagnetic spectrum. As would be appreciated by a person skilled in the art, the visible spectrum is the light spectrum visible with the naked eye.

In one form of the present invention, the marking composition comprises one or more encoding compounds. Preferably, a particular property of the encoding compounds may be associated with information relating to the article. It is envisaged that a particular property of the encoding compounds may be unique to the article or a group of articles such that analysis of the encoding compounds will allow the article to be authenticated. More specifically, the unique property of the encoding compounds will be selected from one or more of the selection of encoding compounds used, the concentration of each encoding compound and the ratio of concentrations of the encoding compounds. It is envisaged that the marking composition may incorporate encoding compounds such as those contemplated by International Patent Application PCT/AU2013/000656, the disclosure of which is incorporated by reference in its entirety.

In one form of the present invention, the identification mark is applied directly to the article.

In an alternative form of the present invention, the identification mark is applied to a substrate which is applied to or otherwise associated with the article. Suitable substrates include adhesive stickers or article tags.

In one form of the present invention the identification mark is applied to the article by spraying droplets of the marking composition on the article or substrate. It is understood by the inventors that when the sprayed marking composition comes into contact with the article or substrate, the droplets produce an array of markings of varying shapes, sizes and spatial distribution. Without wishing to be bound by theory, it is understood by the inventors that the spraying of the marking composition is a stochastic process. By exploiting the inherent randomness of the spraying process, each spray results in the formation of a unique identification mark.

In one form of the present invention, the spray is formed by passing the marking composition through an atomiser. Preferably, the atomizer is selected from the group comprising spray nozzles, aerosols and nebulizers.

In one form of the present invention, where the identification mark is formed by spraying the marking composition on the article, the identification mark is recorded on the database by capturing image data of the identification mark following application.

In an alternative form of the present invention, the identification mark is printed. In one form of the present invention, the identification mark is printed directly onto the article. Alternatively, the identification mark is printed onto a substrate that is applied to the article. It is envisaged that the printing of the identification mark may include applying the marking composition to the article or substrate, for example by way of inkjet printing. Alternatively the printing of the identification mark on the article or substrate may involve a destructive process, such as etching or engraving.

In one form of the present invention, image data of sprayed droplets of the marking composition may be captured for use in digital printing processes. In an alternative form of the present invention, the identification mark is computer generated.

In accordance with a further aspect of the present invention, there is provided an identification mark suitable for authenticating an article, the identification mark comprising an array of varying sized markings, where the combination of the shape, the spatial distribution and the varying sizes of the markings imparts a distinctiveness to the identification mark.

In one form of the present invention, each of the markings are non-polygonal. In the context of the present invention, the term "non-polygonal" will refer to a shape where the outer perimeter is curved. Suitable non-polynomial shapes include ellipses, circles and irregular shapes with curved perimeters.

In one form of the present invention, the identification mark is applied to an article. Preferably, identification mark is recorded in a database. More preferably, the identification mark is associated with information relating to the article in the database.

In one form of the present invention, comparison of the identification mark on the article with identification marks in the database enables the information relating to the article to be linked with the identification mark on the article.

Preferably, the array of varying sized markings is unstructured.

Preferably, the array of varying sized markings is random.

In one form of the present invention, the step of recording the identification mark in a database more specifically comprises the steps of:
capturing image data of the identification mark; and
storing the captured image data in a database.

In one form of the present invention, the step of comparison of the identification mark on the article with identification marks in the database more specifically comprises the steps of:
capturing image data of the identification mark; and
comparing the image data with the image data of identification marks in the database.

In one form of the present invention, the database is stored on a server. In one form of the present invention, the server is a remote server. Preferably, the image data is uploaded to the server or remote server for comparison with the database.

In one form of the present invention, image data of the identification mark is captured with an image capturing device.

In one form of the present invention, the comparison of the image data and the database is performed using an image comparison algorithm.

In one form of the present invention, the identification mark is applied to the article using a marking composition. Preferably, at least a portion of the marking composition is a liquid. Preferably, the liquid portion dries or evaporates upon application.

In one form of the present invention, the marking composition is visible in the visible spectrum. In an alternative form of the present invention, the marking composition is not visible in the visible spectrum. Preferably, where the marking composition is not visible in the visible spectrum, the marking composition contains compounds that fluoresce in the visible spectrum under excitement or are visible in different parts of the electromagnetic spectrum.

In one form of the present invention, the marking composition comprises one or more encoding compounds.

In one form of the present invention, the identification mark is applied directly to the article.

In an alternative form of the present invention, the identification mark is applied to a substrate which is applied to the article.

In one form of the present invention the identification mark is formed by spraying droplets of the marking composition on the article or substrate.

In one form of the present invention, the spray is formed by passing the marking composition through an atomiser. Preferably, the atomizer is selected from the group comprising spray nozzles, aerosols and nebulizers.

In one form of the present invention, where the identification mark is formed by spraying the marking composition on the article, the identification mark is recorded on the database by capturing image data of the identification mark.

In an alternative form of the present invention, the identification mark is computer generated.

In one form of the present invention, image data of sprayed droplets of the marking composition may be captured for use in digital printing processes. In an alternative form of the present invention, the identification mark is computer generated.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 5(c) shows the identification of the portions of FIG. 5(c) by image recognition software;

DESCRIPTION OF EMBODIMENTS

The present invention provides for a method of marking an article with an identification mark and storing the identification mark in a database. The method of the present invention allows for the authentication of the article through comparison of the identification mark on the article and the identification marks on the database.

Figure 1:
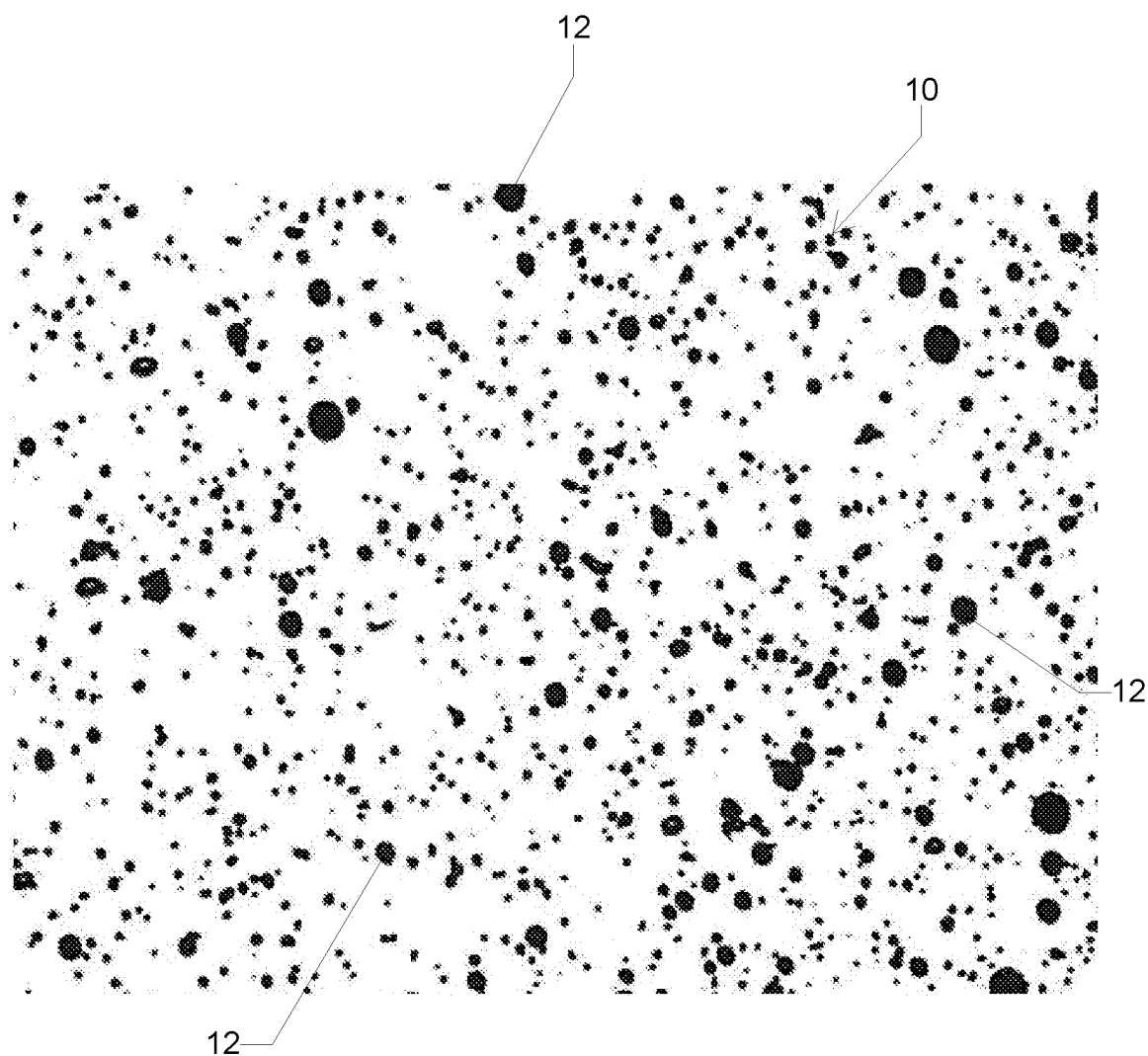
FIG. 1 is an image of an identification mark in accordance with the present invention.
Figure 2:
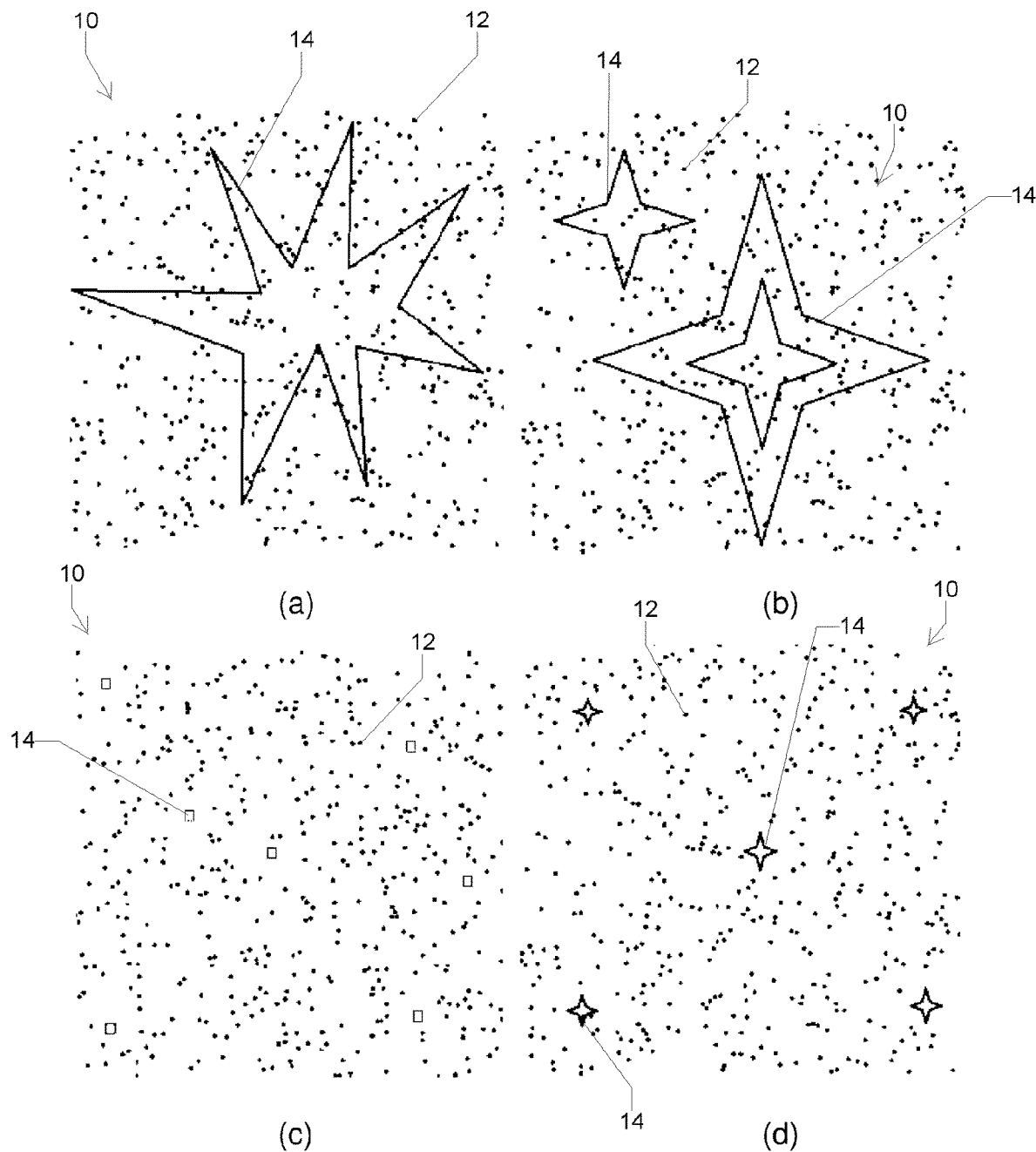
FIGS. 2(a)-(d) shows four identification marks in accordance with the present invention that have been generated digitally.

In FIG. 1 there is shown an example identification mark 10 in accordance with an embodiment of the present invention. As will be apparent from FIG. 1, the identification mark comprises an array of markings 12. The combination of the shape, the spatial distribution and the varying sizes of the markings 12 imparts a distinctiveness to the identification mark 10.

As discussed above, the inventors have determined that an identification mark based on an array of markings of varying shapes, sizes and spatial distribution allows for exponentially increasing number of identification marks that can be generated with each extra marking in the identification mark. To confirm this hypothesis, a theoretical analysis of the grids of different sizes was undertaken. The result of this analysis are shown in Table 1.

TABLE 1

| image size | Resolution (x-axis) in pixels | Resolution (y-axis) in pixels | dot size(pixels) | Num of dots in a row (Nr) | Num of dots in a grid (N = Nr*Nr) | Combinations ($2^N$) |
| --- | --- | --- | --- | --- | --- | --- |
| | 100 | 100 | 50 | 2 | 4 | 16 |
| | 500 | 501 | 50 | 10 | 100 | 1.27E+30 |
| | 750 | 750 | 30 | 25 | 625 | 1.39E+188 |
| 1M | 1280 | 980 | 100 | 96 | 9216 | too big number = inf |
| 3M | 1920 | 1920 | 100 | 192 | 36864 | too big number = inf |
| 5M | 2560 | 2560 | 100 | 256 | 68536 | too big number = inf |

As seen in Table 1, even in a simple 500×500 pixel grid with constant circular 'marking size' of 10 pixels there is more than $1 \times 10^{30}$ variations. As would be appreciated by a person skilled in the art, this analysis does not take into consideration the additional distinctiveness imparted by markings with varying sizes or shapes. When this is factored in, the number of variations increases exponentially.

Marking Size

In one embodiment, the diameter of each marking is greater than 10 µm. In one embodiment, the diameter of each marking is greater than 20 µm. In one embodiment, the diameter of each marking is greater than 30 µm. In one embodiment, the diameter of each marking is greater than 40 µm. In one embodiment, the diameter of each marking is greater than 50 µm. In one embodiment, the diameter of each marking is greater than 60 µm. In one embodiment, the diameter of each marking is greater than 70 µm. In one embodiment, the diameter of each marking is greater than 80 µm. In one embodiment, the diameter of each marking is greater than 90 µm. In one embodiment, the diameter of each marking is greater than 100 µm. In one embodiment, the diameter of each marking is greater than 110 µm. In one embodiment, the diameter of each marking is greater than 120 µm. In one embodiment, the diameter of each marking is greater than 130 µm. In one embodiment, the diameter of each marking is greater than 140 µm. In one embodiment, the diameter of each marking is greater than 150 µm. The diameter is measured at the widest span of each marking.

In one embodiment, the diameter of each marking is less than 10,000 µm. In one embodiment, the diameter of each marking is less than 9,000 µm. In one embodiment, the diameter of each marking is less than 8,000 µm. In one embodiment, the diameter of each marking is less than 7,000 µm. In one embodiment, the diameter of each marking is less than 6,000 µm. In one embodiment, the diameter of each marking is less than 5,000 µm. The diameter is measured at the widest span of each marking.

Image Capture

Once the identification mark has been applied to the article, image data of the identification mark is captured for storage in the database. It is envisaged that the identification mark will be captured by a suitable image capturing device, such as a digital camera. The main constraint on the image capturing device is the minimum resolution of the image sensor. As the resolution increases, so does the amount of detail of the identification mark that may be captured.

In one form of the present invention, the resolution of the image data is at least 72 pixels per inch. In one form of the present invention, the resolution of the image data is at least 100 pixels per inch. In one form of the present invention, the resolution of the image data is at least 150 pixels per inch. In one form of the present invention, the resolution of the image data is at least 200 pixels per inch. In one form of the present invention, the resolution of the image data is at least 250 pixels per inch. In one form of the present invention, the resolution of the image data is at least 300 pixels per inch. In one form of the present invention, the resolution of the image data is at least 350 pixels per inch. In one form of the present invention, the resolution of the image data is at least 400 pixels per inch. In one form of the present invention, the resolution of the image data is at least 450 pixels per inch. In one form of the present invention, the resolution of the image data is at least 500 pixels per inch.

When an article bearing an identification mark requires authentication, image data is again collected for comparison against the database. It is envisaged that any digital image capturing device will be suitable for this purpose. It is envisaged that the most likely image capturing device will be a portable image capturing device, such as the camera on a mobile telephone.

In one form of the present invention, the resolution of the image data collected by the digital image capturing device is at least 100 pixels per inch. In one form of the present invention, the resolution of the image data collected by the digital image capturing device is at least 150 pixels per inch. In one form of the present invention, the resolution of the image data collected by the digital image capturing device is at least 200 pixels per inch. In one form of the present invention, the resolution of the image data collected by the digital image capturing device is at least 250 pixels per inch. In one form of the present invention, the resolution of the image data collected by the digital image capturing device is at least 300 pixels per inch. In one form of the present invention, the resolution of the image data collected by the digital image capturing device is at least 350 pixels per inch. In one form of the present invention, the resolution of the image data collected by the digital image capturing device is at least 400 pixels per inch. In one form of the present invention, the resolution of the image data collected by the digital image capturing device is at least 450 pixels per inch. In one form of the present invention, the resolution of the image data collected by the digital image capturing device is at least 500 pixels per inch.

Database

Once image data of the identification mark is captured, this image data will be stored in the database. Other relevant information about the article can also be stored in the database and will be associated with the image data. It is envisaged that the other relevant information will assist in the authentication process. The additional information can include information about the location and time the image was captured, how the image was captured, information about the item or any other identifying information that will help confirm the authenticity of the item.

The image data may be captured in any image format available in the art, including, for example, jpeg or png formats.

To assist is later comparison, the captured image data may undergo a number of transformations to adhere to a standardised format. Such transformations include morphology transformations, such as cropping, rotation, scale adjustments. Other transformations include colour conversation to black and white. The threshold for the conversion to black and white is preferably set quite high (250 on a 255 colour scale) to ensure all relevant features are captured.

In one embodiment, the database is blockchain enabled.

The database will likely be stored in a digital server that will allow remote access for the purposed of comparing image data.

Image Comparison Software

When an article requires authentication, image data of the identification mark is captured and compared against the database. In order to efficiently compare the identification mark against those in the database, a computer implemented image comparison algorithm may be used to compare the captured image to the database.

This image comparison algorithm will determine if the captured image data matches image data in the database. Once a match is made, the information in the database associated with the image data can be used to authenticate the article. Such information may include the location of the where the new image is being captured, whether this image has been captured before, and other potential identifiers.

It is envisaged that the image comparison algorithm processes images using mathematical operations to produce a set of characteristics or parameters related to the image. The algorithm then compares the set of characteristics or parameters with those on the database to identify a match. In the context of the present invention, it is envisaged that the set of characteristics will include the shape and spatial distribution of the markings. As would be appreciated by a person skilled in the art, there are a number of feature detection algorithms that are available, including scale-invariant feature transform (SIFT), speeded up robust features (SURF) and Binary Robust Invariant Scalable Keypoints (BRISK). Such algorithms will produce a collection of descriptors that can later be compared.

It is envisaged that the image comparison algorithm may be implemented into a software application. Commercially available image comparison software includes Craftar® by catchoom (www.catchoom.com) and ImageJ (https://en.wikipedia.org/wiki/ImageJ). Alternatively, custom pattern recognition software may be implemented.

The comparison of image data against a large database can be time consuming and so it is envisaged that certain filtering means may be implemented to narrow the size of the database that the image data is being compared against. The filtering means may be physical or software based. Physical filtering means can include a generalised identifier at the point of the article to which the identification mark is applied, including logos, barcodes or even the shape of the article. It is envisaged that the generalised identifier may be readily identified by the image comparison software to quickly limit the size of the database against which the comparison is to be made. Software based filtering means may include two-part image comparison, where the first part includes a lower matching threshold than the second part to quickly eliminate a portion of the database. Alternatively an indexing mechanism may be implemented. One particularly useful indexing algorithm identified by the inventors is the Bag of Visual Words (BoVW) algorithm. As would be appreciated by person skilled in the art, this algorithm takes an entire collection of descriptor sets, and using a portion of these generates a number of mean descriptors which are saved as what is called a codebook. The codebook can then be used to calculate the bag of visual words for each image in the collection. This is done by comparing the descriptors of each image, with the mean descriptors in the codebook and extrapolating the bag of words accordingly. Images that are to be matched have their descriptors and BoVW identified on demand, and these can be used to find appropriate matches in the pre-compiled index.

Mobile Application

It is envisaged that a mobile application can capture and process an image of the identification mark and provide an interface to the database. By this means, the application will be able to tell a user whether the item is authentic.

Marking Composition

In one embodiment of the present invention, a marking composition is used to apply the identification mark. The marking composition comprises a liquid portion, or carrier portion, that will dry or evaporate after application to the article or substrate. Suitable marking compositions include inks, dyes and paints. It is preferred that the marking composition will not run or drip following application to the article or substrate.

The marking composition may be visible to the naked eye. Alternatively, the marking composition may be invisible in the viable spectrum and may fluoresce under excitement by a light source of a specific wavelength. If the liquid is invisible, a suitable light source that is of the proper frequency to reflect off the liquid and show the pattern will have to be available to capture the original image, and to show up the pattern when it is being authenticated. This light source may be incorporated into the image capturing device.

The liquid, whether it is visible or invisible, may contain additional encoding compounds to provide an additional means of authentication. As discussed previously, an example of a suitable encoding means is one that incorporates encoding compounds such as those contemplated by International Patent Application PCT/AU2013/000656. Such encoding compounds use a specific ratio of rare-earth compounds within the encoding compound to link the encoding compound to a particular owner. It is envisaged that the incorporation of such encoding compounds into the marking composition will provide a further level of identification that would not be readily apparent to potential counterfeiters and would be difficult to recreate.

By providing an additional encoding means within the liquid, a secondary analysis can be performed on the liquid. The secondary analysis could be used when the authenticity of the article remains in doubt following the comparison of the identification mark and the database.

In one form of the present invention, the marking composition is edible and/or non-toxic. It is envisaged by the application that the marking composition may be applied directly to foodstuffs or pharmaceuticals.

Spray Marks

In one embodiment of the present invention, the identification mark is formed by spraying a mist of the marking composition on the article. It is understood by the inventors that when the mist of the marking composition comes into contact with the article, the droplets form an array of markings of varying shapes, size and spatial distribution. The inventors have determined that this array of markings is suitable for use as the identification mark of the present invention.

In order to produce the mist, the marking composition must be passed through an atomiser. As would be understood by a person skilled in the art, an atomiser is any device that facilitates dispersion of liquid into a mist. Suitable atomizers include spray nozzles, nebulisers and aerosol spray systems. It is understood by the inventors that even under the same process conditions an atomiser will produce an array of markings on the article in a random manner.

It is envisaged that a mobile or handheld device may be used to spray the marking composition on the article. Furthermore, it is envisaged that an image capturing device may be incorporated with the device to capture image data of the applied identification mark.

Spray Nozzles

One particularly useful atomiser device is a spray nozzle. As would be appreciated by a person skilled in the art, spray nozzles utilize the kinetic energy of the liquid to break it up into droplets. This is achieved by using a smaller diameter at the outlet than the inlet. The reduction in diameter and therefore cross-sectional area means that the fluid experiences a pressure drop which increases the velocity of the liquid. As the fluid pressure increases, the flow through the nozzle increases, and the drop size decreases. Many configurations of spray nozzles may be used depending on the desired spray characteristics.

The movement of the marking composition through the nozzle may be actuated by a manual pump or pneumatic compressor. It is envisaged that the use of a pneumatic compressor will allow for a more consistent spray distribution so as to minimise overlapping droplets. The use of a pneumatic compressor will also allow the spray mechanism to be automated to increase efficiency when large numbers of spray patterns are required.

The spray characteristics selected will depend on the article to be sprayed and the resolution of the image capturing device. As would be appreciated by a person skilled in the art, the image capturing device has a limit to the resolution that can be captured. This resolution limit places a limit of the size and separation of the markings that can be discerned by the image capturing device.

An appropriate measure of droplet size is the Volume Median Diameter (VMD). The VMD refers to the midpoint droplet size (mean), where half of the volume of spray is in droplets smaller, and half of the volume is in droplets larger than the mean. A VMD of 400 microns, for example, indicates that half of the volume is in droplet sizes smaller than 400 microns, and half the volume is in droplet sizes larger than 400 microns.

In one embodiment of the present invention, the VMP is greater than 100 μm. In one embodiment, the VMD is above 150 μm. In one embodiment, the VMD is above 200 μm. In one embodiment, the VMD is above 250 μm. In one embodiment, the VMD is above 300 μm. In one embodiment, the VMD is above 350 μm. In one embodiment, the VMD is above 400 μm.

In one embodiment, the VMD is between 150-400 μm.

The optimisation of the spray process conditions should produce particles with a VMD within these ranges.

The area of the spray pattern is dependent on the spray angle of the nozzle (angle of spray that emanates from the nozzle) and the distance of the nozzle from the target. The effect these parameters have on the area of the spray pattern are demonstrated in Table 2 below (A User's Guide to Spray Nozzles' produced by TeeJet Technologies (2013)).

| | Theoretical Spray Coverage (cm$^2$) at Height (cm) | | | | | | | |
|---|---|---|---|---|---|---|---|---|
| Spray Angle | 20 | 30 | 40 | 50 | 60 | 70 | 80 | 90 |
| 15° | 5.3 | 7.9 | 10.5 | 13.2 | 15.8 | 18.4 | 21.1 | 23.7 |
| 20° | 7.1 | 10.6 | 14.1 | 17.6 | 21.2 | 24.7 | 28.2 | 31.7 |
| 25° | 8.9 | 13.3 | 17.7 | 22.2 | 26.6 | 31 | 35.5 | 39.9 |
| 30° | 10.7 | 16.1 | 21.4 | 26.8 | 32.2 | 37.5 | 42.9 | 48.2 |
| 35° | 12.6 | 18.9 | 25.2 | 31.5 | 37.8 | 44.1 | 50.5 | 56.8 |
| 40° | 14.6 | 21.8 | 29.1 | 36.4 | 43.7 | 51 | 58.2 | 65.5 |
| 45° | 16.6 | 24.9 | 33.1 | 41.4 | 49.7 | 58 | 66.3 | 74.6 |
| 50° | 18.7 | 28 | 37.3 | 46.6 | 56 | 65.3 | 74.6 | 83.9 |
| 55° | 20.8 | 31.2 | 41.7 | 52.1 | 62.5 | 72.9 | 83.3 | 93.7 |
| 60° | 23.1 | 34.6 | 46.2 | 57.7 | 69.3 | 80.8 | 92.4 | 104 |
| 65° | 25.5 | 38.2 | 51 | 63.7 | 76.5 | 89.2 | 102 | 115 |
| 73° | 29.6 | 44.4 | 59.2 | 74 | 88.8 | 104 | 118 | 133 |
| 80° | 33.6 | 50.4 | 67.1 | 83.9 | 101 | 118 | 134 | 151 |
| 85° | 36.7 | 55 | 73.3 | 91.6 | 110 | 128 | 147 | 165 |
| 90° | 40 | 60 | 80 | 100 | 120 | 140 | 160 | 180 |
| 95° | 43.7 | 65.5 | 87.3 | 109 | 131 | 153 | 175 | 196 |
| 100° | 47.7 | 71.5 | 95.3 | 119 | 143 | 167 | 191 | 215 |
| 110° | 57.1 | 85.7 | 114 | 143 | 171 | 200 | 229 | 257 |
| 120° | 69.3 | 104 | 139 | 173 | 208 | 243 | | |
| 130° | 85.8 | 129 | 172 | 215 | 257 | | | |
| 140° | 110 | 165 | 220 | 275 | | | | |
| 150° | 149 | 224 | 299 | | | | | |

Spray Target

As discussed above, the marking composition may be sprayed directly onto the article. This is particularly useful when the discreet marking of items is required. A further advantage of directly spraying the article with the marking composition is that it allows the marking of the article to be incorporated in the production process. It is envisaged that the marking of the article may be automated and included in the production line. Furthermore, the capture of the image data of applied mark may also be included in the production process.

It is understood by the inventors that the image comparison is simplified if the spray patter is limited to a predefined area. In order to limit the area of the spray, a stencil can be used.

To assist in image comparison, it is advantageous to be able to identify the orientation of the identification mark. If a stencil is used, it is envisaged that the stencil may include a reference marker or indentation that can be used to orientate the identification mark. Alternatively, markings on the article itself may be used to orientate the identification mark. Alternatively or additionally, the actual article to be sprayed may be used to orientate the identification mark. For example, if a wine bottle is marked with the identification mark, then the distinctive shape of the wine bottle may be used as the reference marker to orientate the identification mark.

It is envisaged that the reference marker may also be used to assist the pattern recognition software. For example, types or classes of products could all include the same reference marker. In the manner, the pattern recognition software could limit database to only those in the corresponding types or classes of products. It is envisaged by the applicant that this would reduce the time taken to match the identification mark to the database.

As an alternative to spraying the marking composition directly on the article, the marking composition may be sprayed onto a substrate with an adhesive backing, such as product labels or stickers. The substrate can then be applied to the product. In this embodiment, the image of the pattern will be captured once when the sticker or label is sprayed and may also be captured again once it is on the article. A further advantage of the use of a substrate is that a single spray may be directed to a sheet of labels or stickers, whilst still producing an identification mark on each label or sticker.

Printed Identification Marks

In one form of the invention, the identification mark may be printed onto a substrate using any conventional printing process. In a preferred embodiment, the printing process is a digital printing process. As would be appreciated by a person skilled in the art, digital printing processes allow the printing of a digital image directly onto a substrate. In order to prepare suitable digital images, the inventors have found that the identification mark of the present invention may be sprayed onto a suitable surface that is subsequently scanned by an optical image scanner to generate a digital image. The generated digital image can then be printed onto the substrate using the digital printer.

The inventors have found that if the scanned image is large enough, then the digital image may be divided into a number of smaller digital images that remain unique. It is envisaged that a large number of unique digital identification marks may be generated from a single scan of a sprayed pattern. An advantage of this process is that the digital images are still generated as a result of a spray process and so the array of markings remain completely random. This is distinct from a structured coding system, such as a QR Code™, that is generated on the basis of a set of predetermined rules.

Digitally Generated Marks

In one embodiment of the present invention, the identification mark is digitally generated. It is envisaged that the digitally generated identification mark may be either directly printed onto the article or it may be printed onto a substrate that is applied to the article.

As would be understood by a person skilled in the art, a random pattern may be generated by digital means based on a set of criteria. The inventors have determined that the following criteria contribute to the generation the identification mark:

The size constraints for the pattern;
The number of markings to be provided in the area;
The limitation of the random marking size distribution; and
The limitation of the marking placement distribution.

It is understood by the inventors that the marking size, placement and shape parameters are bound by the constraints of the image capturing device and the pattern recognition software.

As shown in FIGS. 2(a)-(d), the digitally generated pattern can also be overlaid by a known pattern 14 to assist the pattern recognition software. It is envisaged that such known patterns may assist in the comparison of the identification mark against the database. For example, a certain known pattern can be used to separate individual types or classes of products. In this manner, the pattern recognition software could limit database to only those in the corresponding types or classes of products. It is envisaged by the applicant that this would reduce the time taken to match the identification mark to the database.

Example 1

A series of different commercially available manual operation spray bottles were trialled for the application of a marking composition on a surface. For the purposes of the trial, a black paint was used as the marking composition. In each trial, the nozzle was positioned in front of a spray surface and the nozzle was actuated to produce a mist of the marking composition directed towards the surface. The surface was replaced and the process was repeated. In each repetition, the distance between the nozzle and the spray surface was kept constant.

Figure 3A:
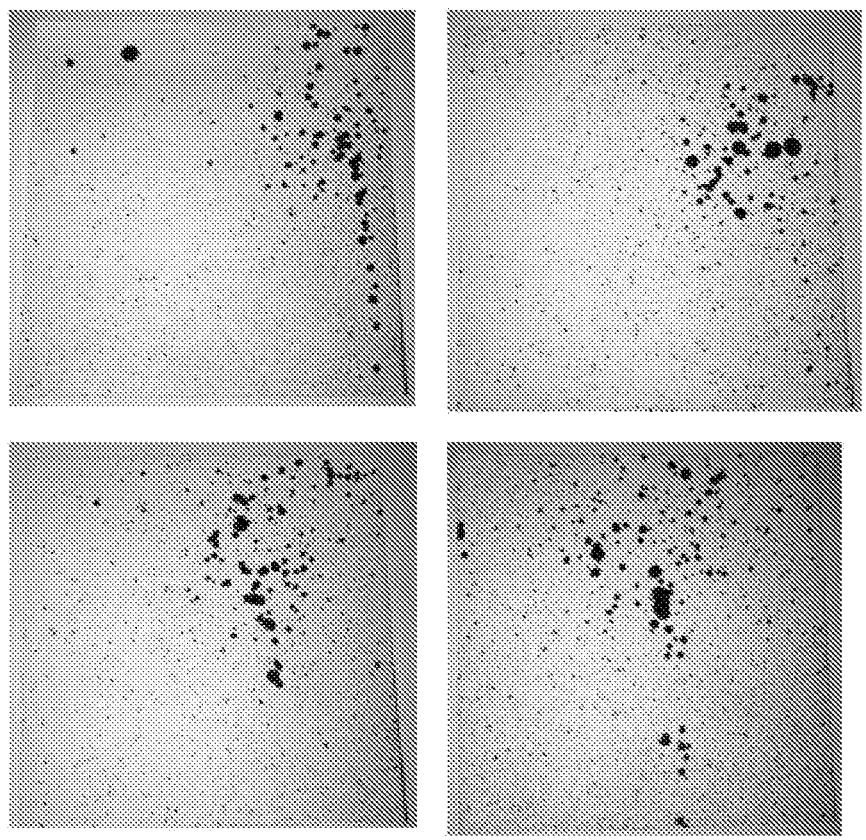
FIGS. 3(a)-(c) show a series of photographs of the identification marks generated in Example 1.
Figure 3B:
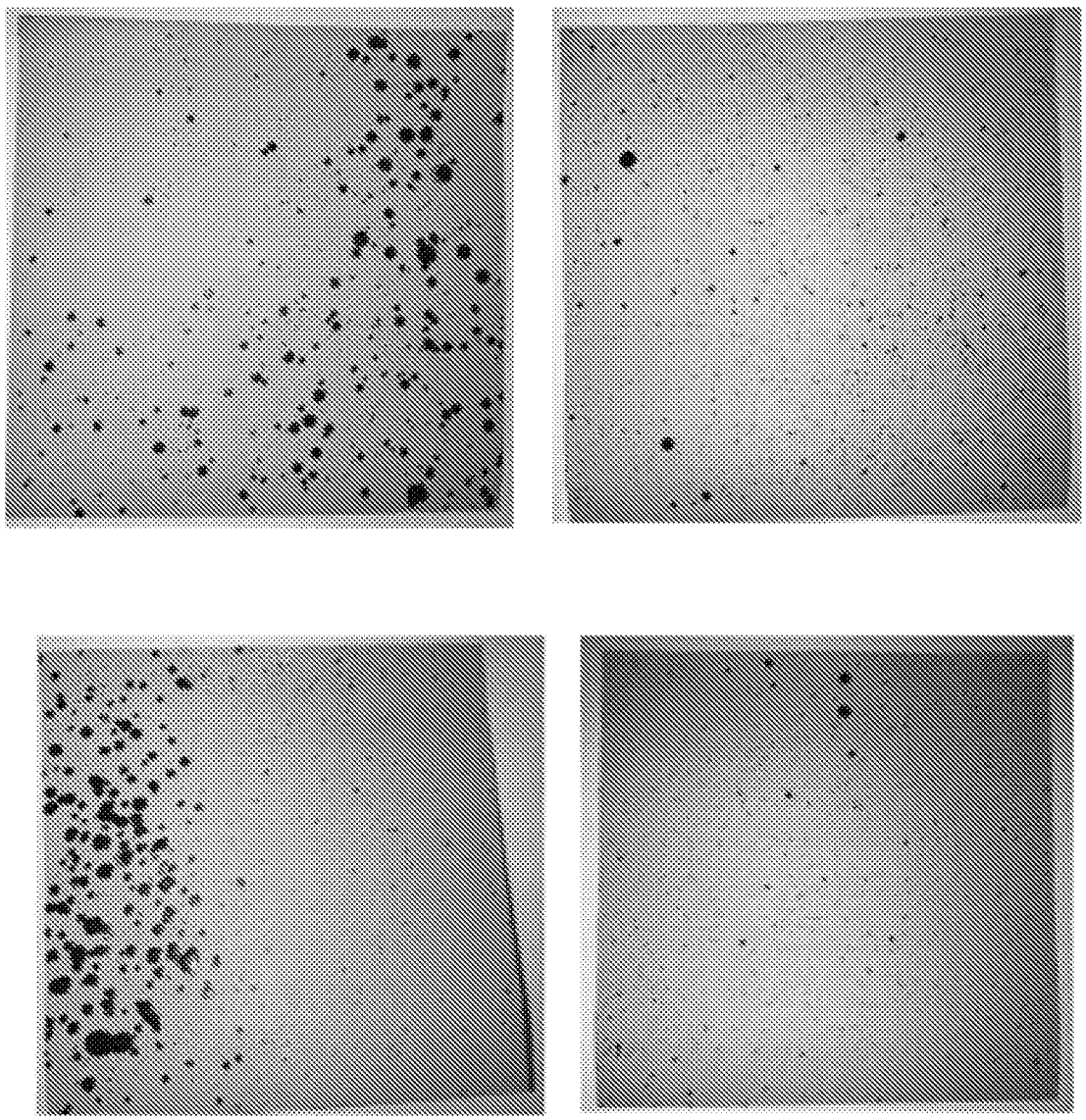
Figure 3C:
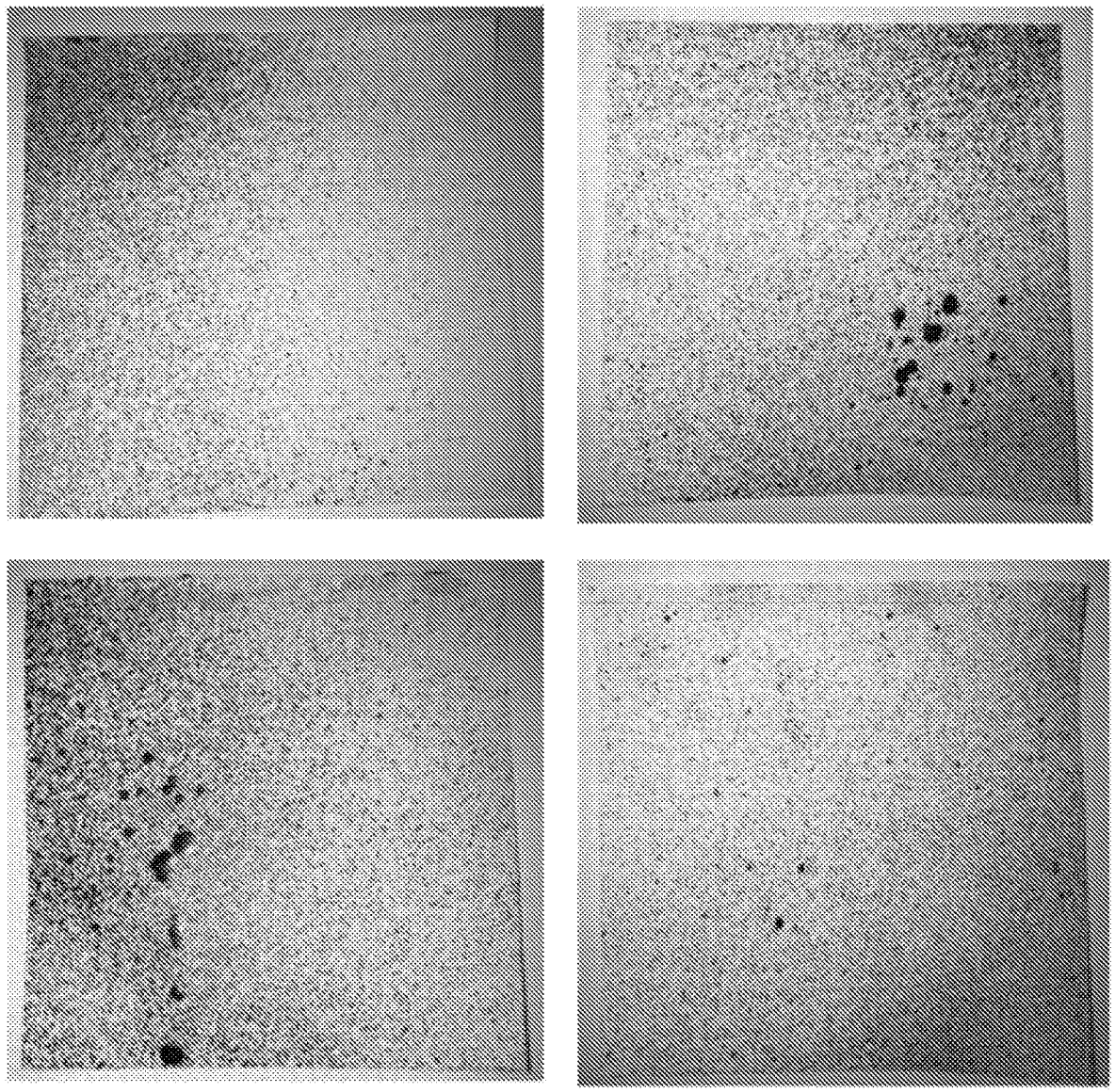

The results of these trials are shown in FIGS. 3(a)-(c). As can be noted from the results, each individual spray produced a unique array of droplets despite the constant spray distance. This occurred across all the spray nozzles trialled.

Example 2

Figure 4:
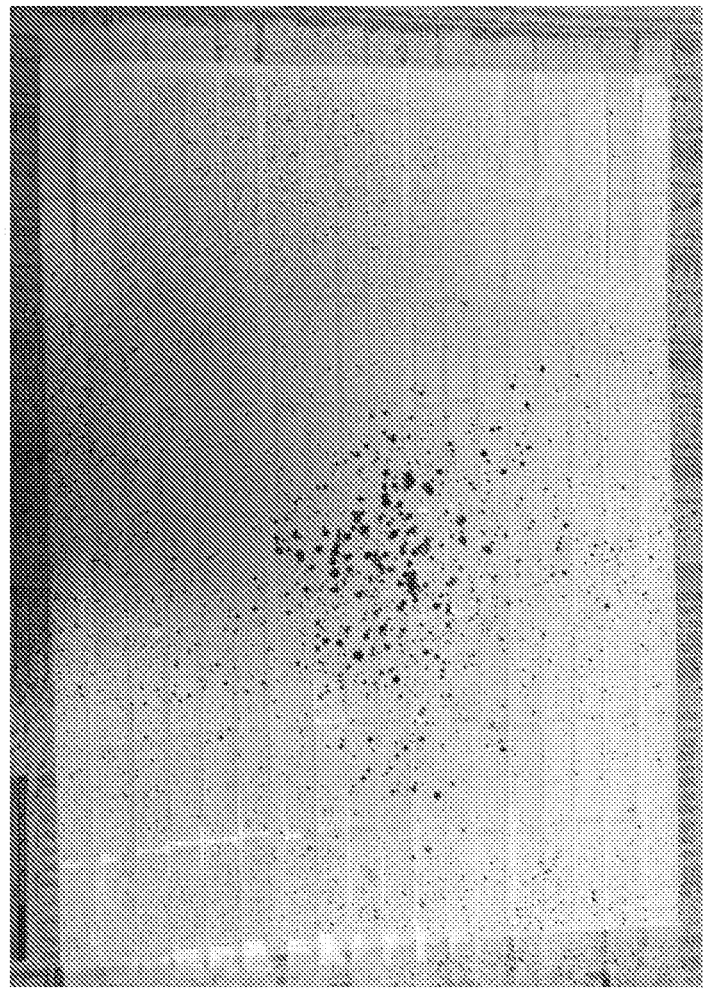
FIG. 4 shows an identification mark applied to the sheet of adhesive backed labels of Example 2.

A trial was undertaken to access the ability to apply the identification mark to a series of adhesive backed labels on a single sheet. Similarly to Example 1, black paint was used as the marking composition. The nozzle was held at constant distance from the sheet adhesive backed labels and a single spray was directed to the sheet. The results of this test are shown in FIG. 4(a). As can be seen from FIG. 4(a), a single spray produced an identification mark on each individual label. Image data of each label may then be captured and stored in the database before the labels are applied to suitable articles.

Example 3

Figure 5A:
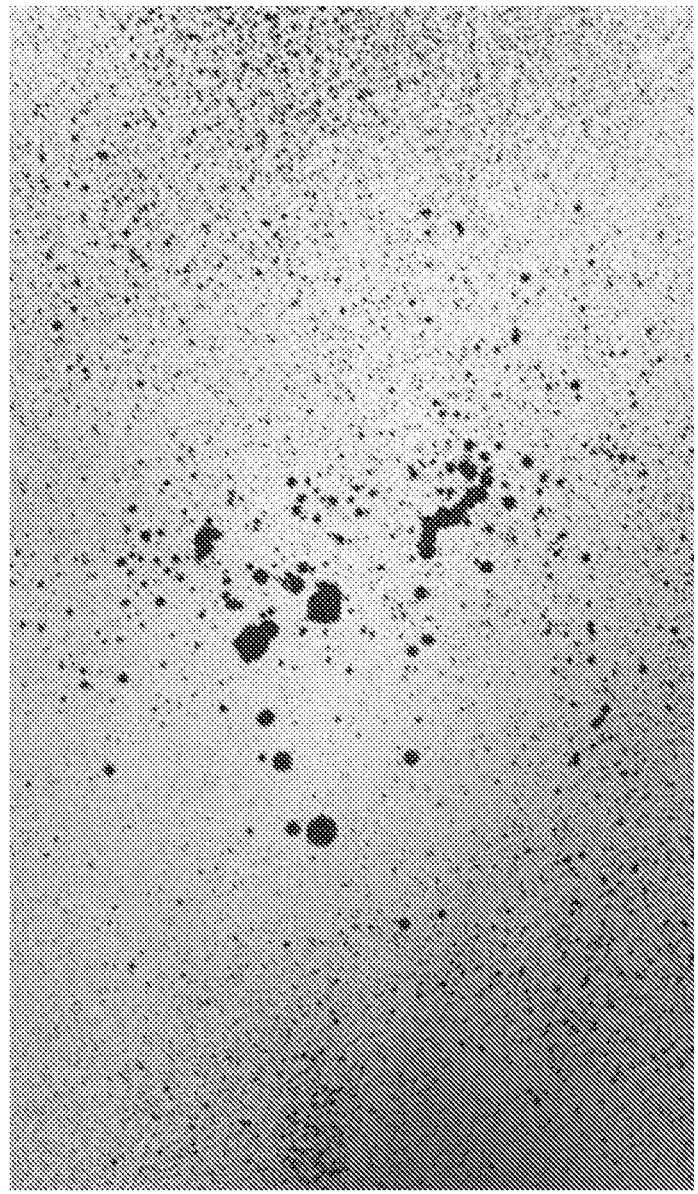
FIG. 5(a) shows an identification mark applied to a sheet of Example 3.
Figure 5B:
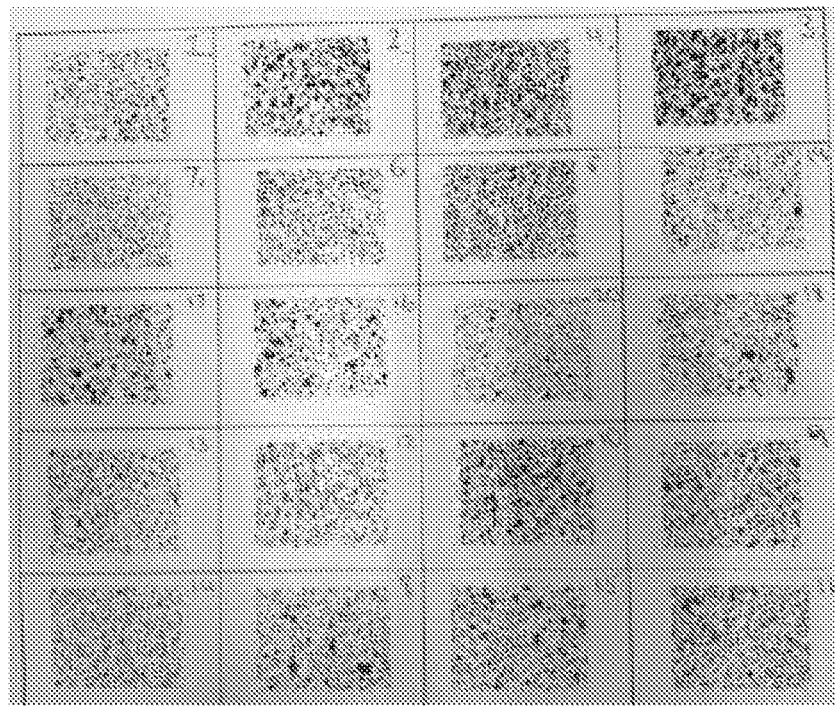
FIG. 5(b) shows the sheet of FIG. 5a separated into individual portion.
Figure 5C:
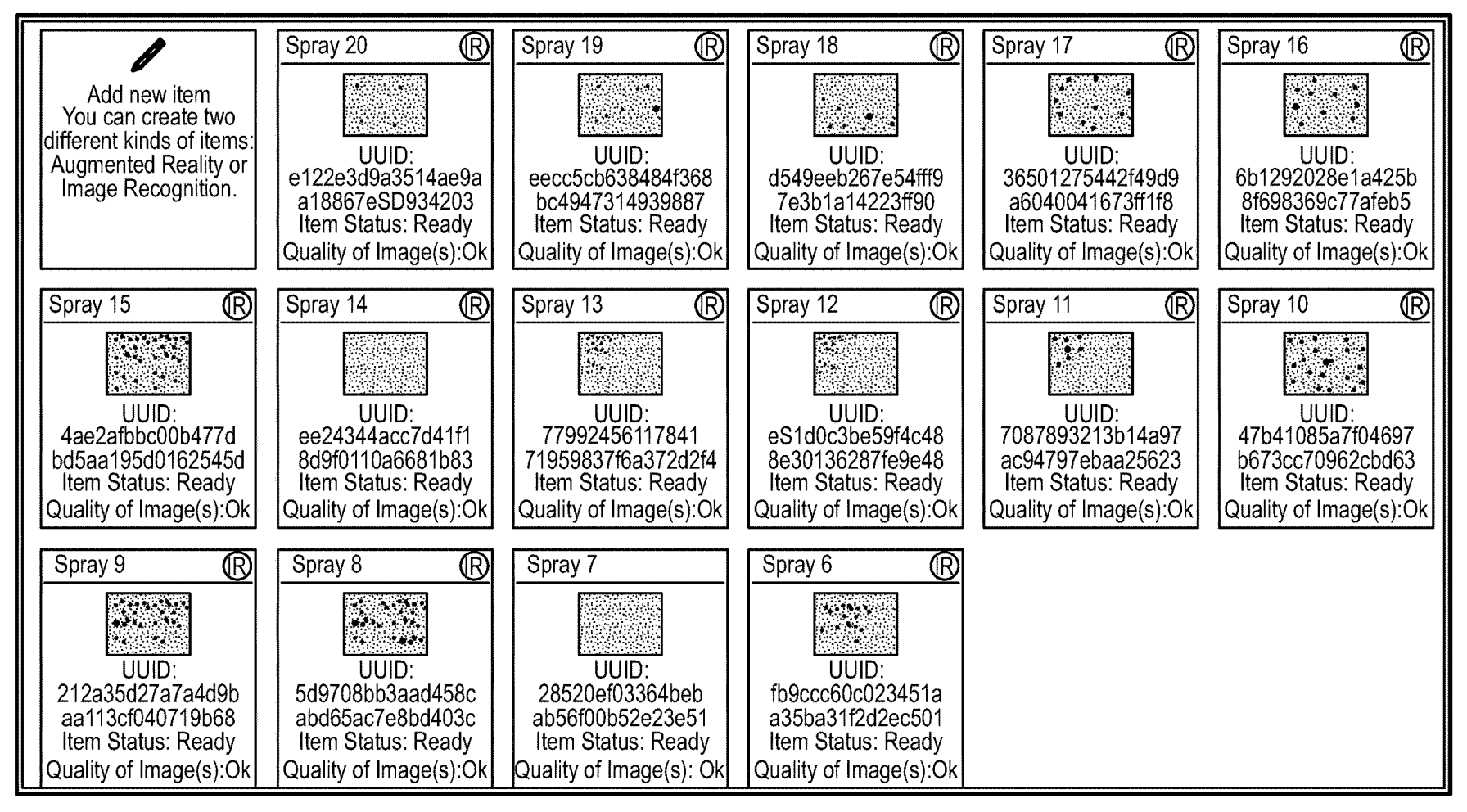

A trial was undertaken to assess the ability of image comparison software to process images that contain the identification mark of the present invention. Similar to Example 1, an array of droplets was formed on a single test surface using a spray nozzle. The marking composition was black paint. The results are shown in FIG. 5a. As shown in FIG. 5b, the test surface was separated into 20 equally sized portions and the images of each portion were digitally captured. The images were uploaded to an image recognition software called Craftar™ by catchoom (www.catchoom-.com). As seen in FIG. 5c, Crafter was able to recognise each of the 20 images as unique.

Example 4

Figure 6:
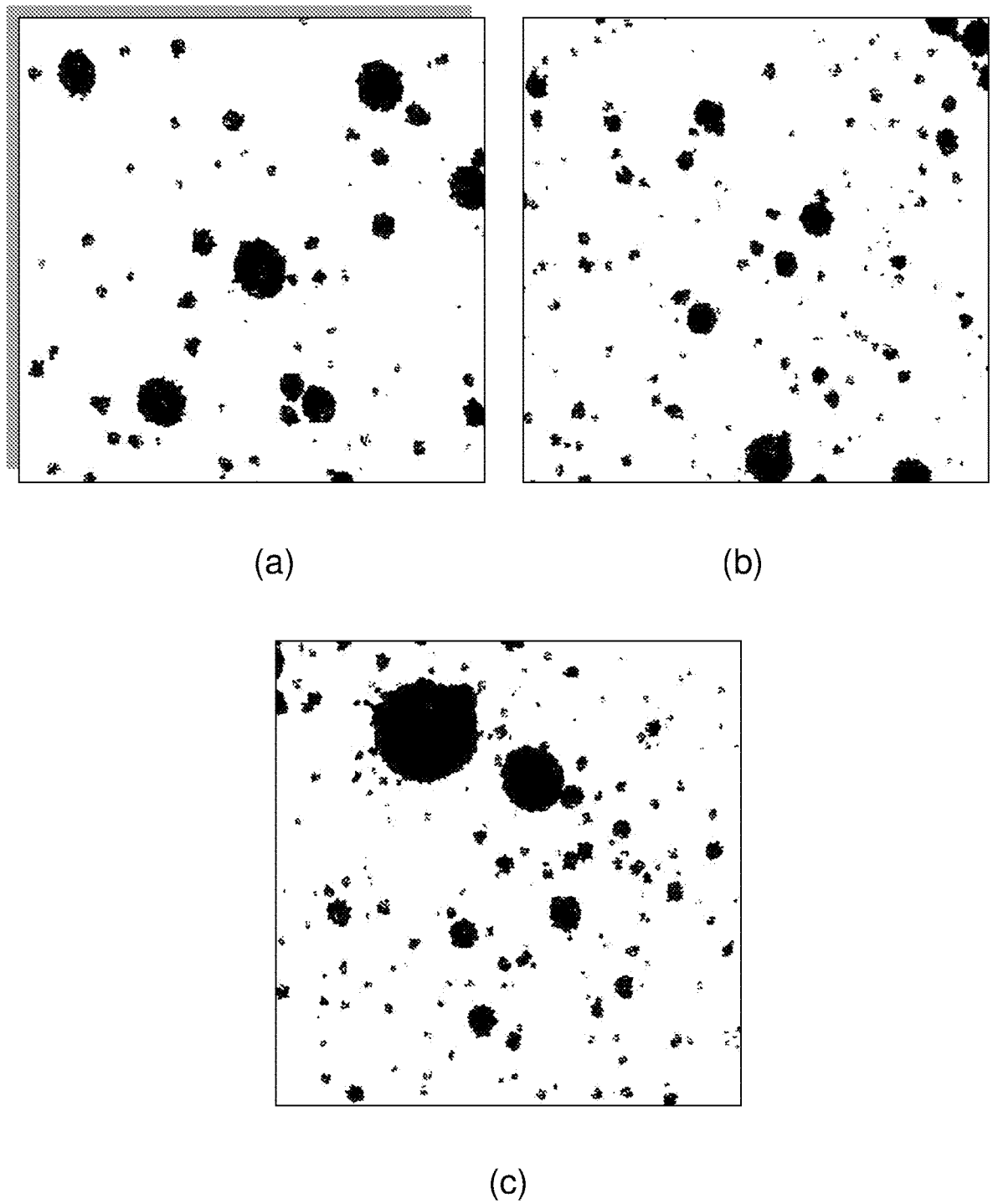
FIGS. 6(a)-(c) shows set of identification marks of Example 3.

A trial was undertaken to investigate the use of alternative image feature detection and comparison algorithms. A set of different identification marks in accordance with the present invention were generated by spraying black paint on a surface. Image data of each identification mark was captured and the images are reproduced in FIG. 6(a)-(c).

Figure 7A:
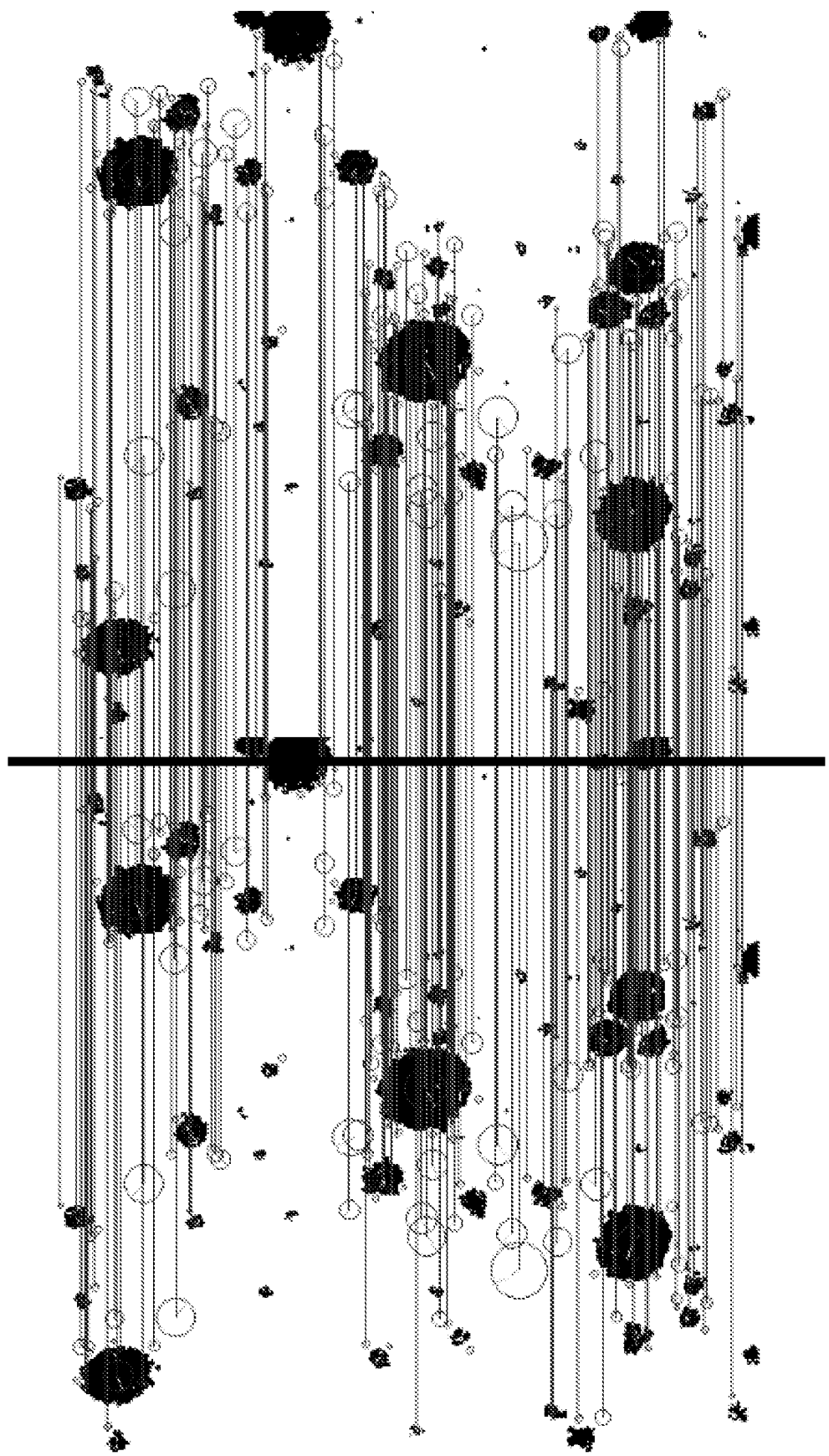
FIGS. 7(a)-(c) shows comparison data of the identification marks of FIGS. 6(a)-(c)
Figure 7B:
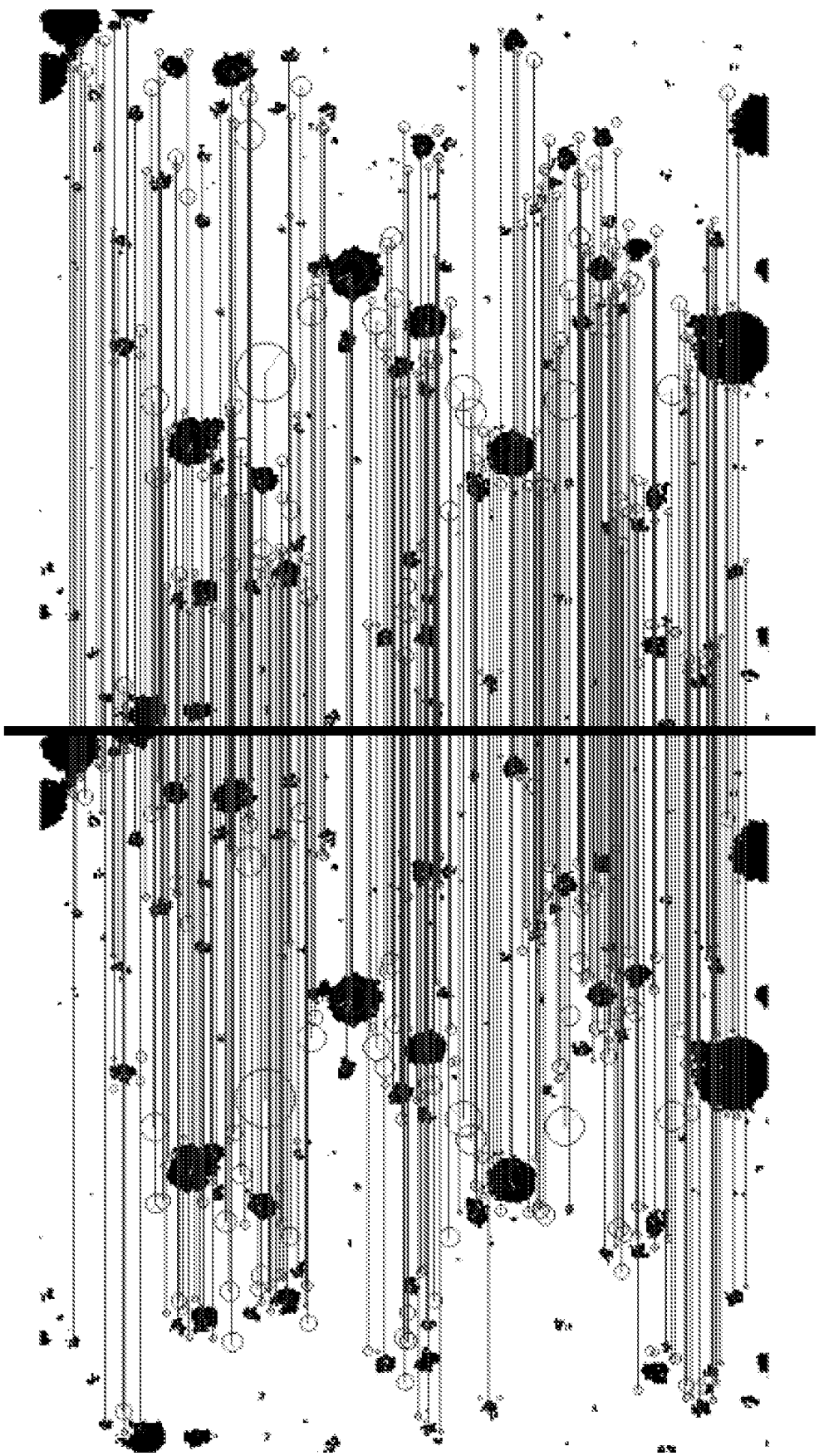
Figure 7C:
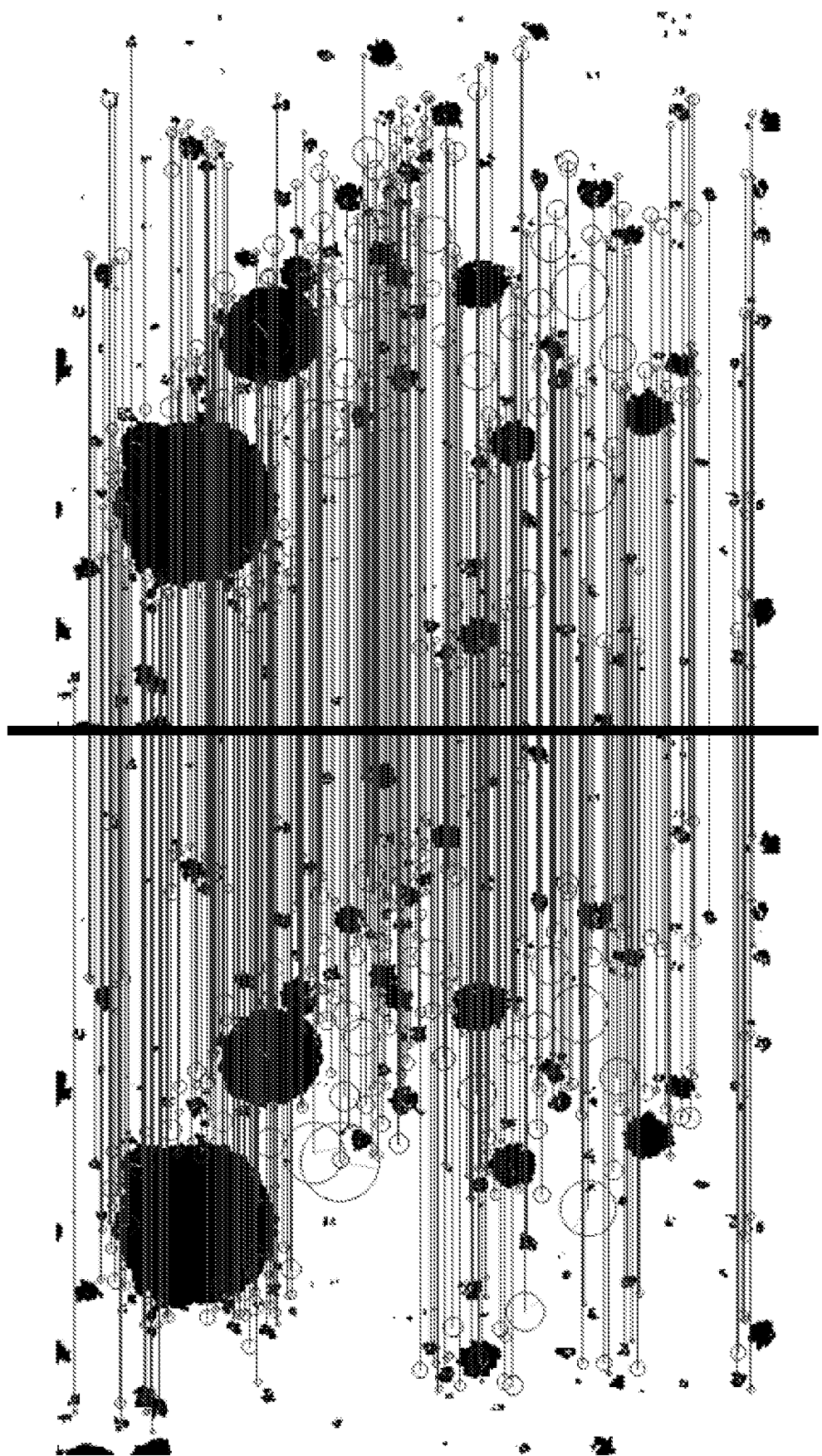

Each of images were matched against themselves using SURF vector matching. Graphical representations of the SURF vector matching results are shown in FIGS. 7(a)-(c). As would be appreciated by person skilled in the art, the SURF algorithm identifies keypoint vectors, which are identified be the circles in these images. These vectors are objects that describe the characteristics of the particular location in the image. The lines are the comparisons between two vectors. The vector collections are first indexed to assist in the vector comparison. Each of the comparisons made showed strong matches of 100%.

Figure 8A:
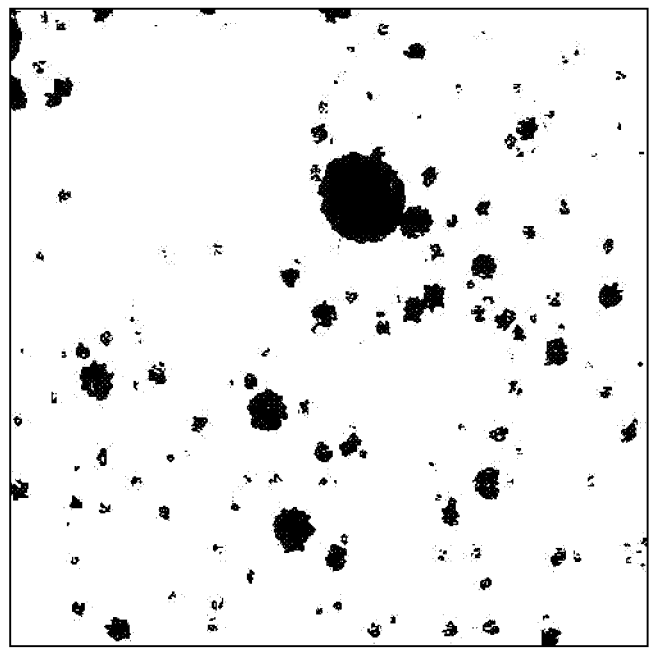
FIG. 8(a) shows an altered identification mark of Example 4.
Figure 8B:
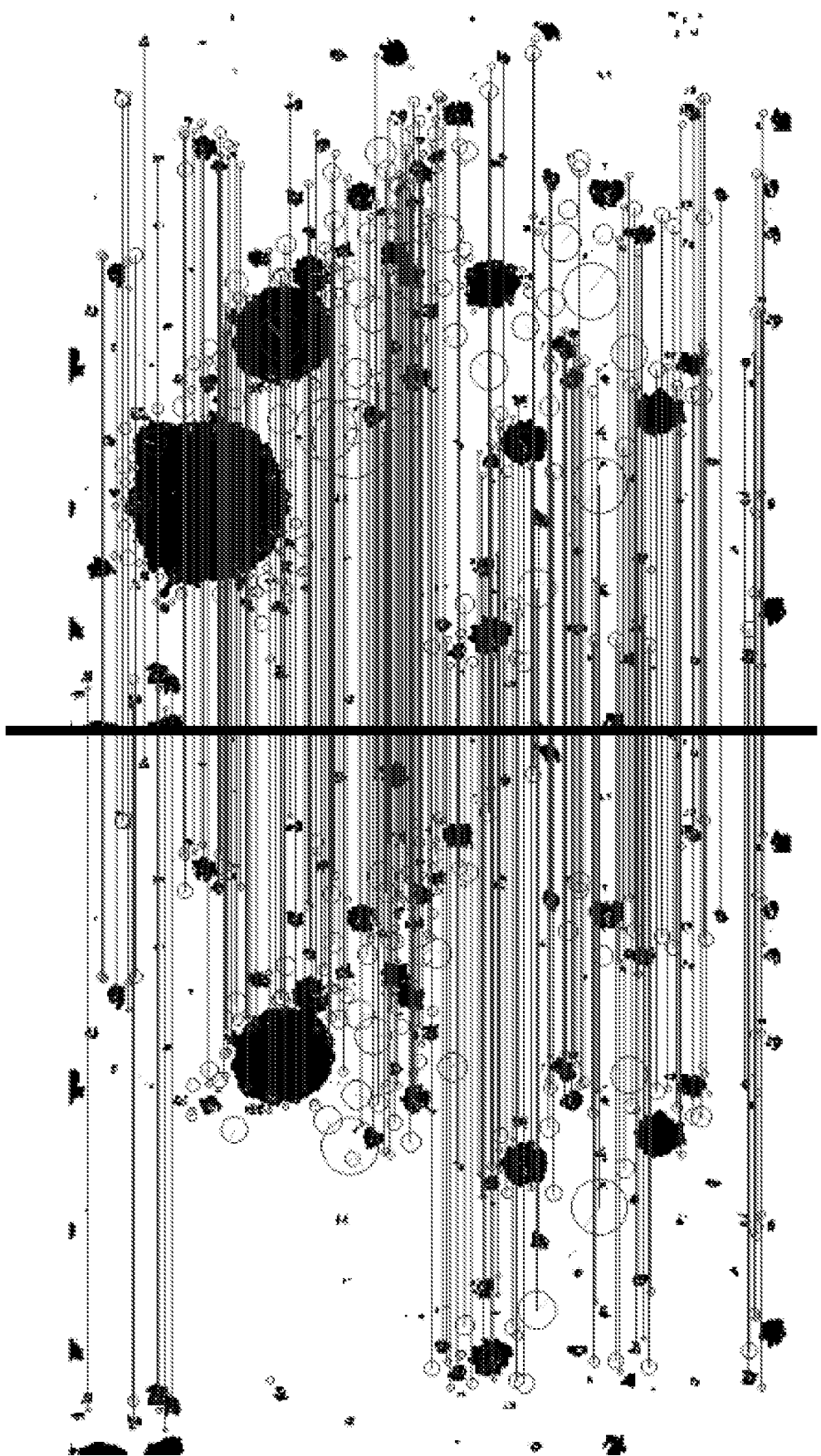
FIG. 8(b) shows comparison date of the identification marks of FIG. 8(a) with FIG. 6(c).

To test a non-match, original image 6(c) was altered to remove some features. The altered image is shown in FIG. 8(a). The image of FIG. 8(a) was matched against FIG. 6(a) using SURF vector matching. Graphical representations of the SURF vector matching results are shown in FIG. 8(b). As can be seen in FIG. 8(b) a number of the vectors could not be compared, resulting in not graphical lines. The comparison resulted in a poor match of 42%.

The results of Example 4 demonstrate that the SURF algorithm may be used to make a comparison between images data of the identification marks of the present invention. It is envisaged that similar algorithms may also be used.

Example 5

An investigation into the spray characteristics required for a typical image capturing device was undertaken to further understand how the identification mark may be optimised. The image capturing device used for this investigation was an iPhone 7. For purposed of this investigation, it was assumed that the image will be captured in the middle ⅑ quadrant of the phone screen, when the screen is separated into a 3×3 grid. This equated to an estimated image size of 2.5 cm×2 cm.

The iPhone 7 has a resolution of 7 Mega-Pixels and so the camera will capture approximately 0.8 Mega-Pixels. This provides a pixel size of approximately 25 microns. As such the camera is able to discern 25 micron sized markings separated by 25 micron spaces.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

The invention claimed is:

1. A method of marking an article for authentication, the method comprising the steps of:
   applying an identification mark to an article, said identification mark comprising a random array of varying sized markings, wherein a combination of a shape, a spatial distribution and the varying sizes of the markings imparts a distinctiveness to the identification mark;
   recording the identification mark in a database; and
   associating information relating to the article with the identification mark in the database,
   wherein comparison of the identification mark on the article with identification marks in the database enables the information relating to the article to be linked with the identification mark on the article.

2. The method according to claim 1, wherein the markings are non-polygonal.

3. The method according to claim 1, wherein the array of varying sized markings is unstructured.

4. The method according to claim 1, wherein the database tracks the date and location of the article when the comparison is made.

5. The method according to claim 1, wherein the step of recording the identification mark in a database more specifically comprises the steps of:
   capturing image data of the identification mark; and
   storing the captured image data in the database.

6. The method according to claim 1, wherein the step of comparison of the identification mark on the article with identification marks in the database more specifically comprises the steps of:
   capturing image data of the identification mark; and
   comparing the image data with the image data of identification marks in the database.

7. The method according to claim 1, wherein the database is stored on a server.

8. The method according to claim 1, wherein the database is stored on a remote server.

9. The method according to claim 8, wherein the image data is uploaded to the remote server for comparison with the database.

10. The method according to claim 5, wherein the image data of the identification mark is captured with an image capturing device.

11. The method according to claim 6, wherein the step of comparison of the identification mark on the article with identification marks in the database comprises uploading the captured image data to the database for comparison.

12. The method according to claim 1, wherein the comparison of the image data and the database is performed using an image comparison algorithm.

13. The method according to claim 1, wherein the identification mark is applied to the article using a marking composition.

14. The method according to claim 13, wherein at least a portion of the marking composition is a liquid.

15. The method according to claim 13, wherein the marking composition comprises one or more encoding compounds.

16. The method according to claim 1, wherein the identification mark is applied directly to the article.

17. The method according to claim 1, wherein the identification mark is applied to a substrate which is applied to or otherwise associated with the article.

18. The method according to claim 13, wherein the identification mark is formed by spraying droplets of the marking composition on the article or a substrate which is applied to or otherwise associated with the article.

19. The method according to claim 18, wherein the spray is formed by passing the marking composition through an atomiser.

20. The method according to claim 18, wherein the identification mark is formed by spraying the marking composition directly on the article or the substrate.

21. The method according to claim 1, wherein the identification mark is printed.

* * * * *